(12) United States Patent
Hao et al.

(10) Patent No.: US 9,277,356 B2
(45) Date of Patent: Mar. 1, 2016

(54) SYSTEM AND METHOD FOR ACQUIRING USER LOCATION THROUGH USER BEARER IDENTIFIER

(71) Applicant: ZTE CORPORATION, Shenzhen, Guangdong (CN)

(72) Inventors: Zhenwu Hao, Shenzhen (CN); Tao Fu, Shenzhen (CN); Min Shen, Shenzhen (CN); Hong Jiang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 34 days.

(21) Appl. No.: 14/353,779

(22) PCT Filed: Oct. 8, 2012

(86) PCT No.: PCT/CN2012/082566
§ 371 (c)(1),
(2) Date: Aug. 25, 2014

(87) PCT Pub. No.: WO2013/060225
PCT Pub. Date: May 2, 2013

(65) Prior Publication Data
US 2014/0357300 A1       Dec. 4, 2014

(30) Foreign Application Priority Data

Oct. 24, 2011   (CN) .......................... 2011 1 0325808

(51) Int. Cl.
*H04W 4/02*       (2009.01)
*H04W 4/20*       (2009.01)
(Continued)

(52) U.S. Cl.
CPC *H04W 4/02* (2013.01); *H04W 4/20* (2013.01); *H04W 64/00* (2013.01); *H04W 92/045* (2013.01)

(58) Field of Classification Search
CPC ...................................................... H04W 4/02
USPC ................... 455/456.1, 456.2, 456.3
See application file for complete search history.

(56) References Cited

U.S. PATENT DOCUMENTS

2004/0203914 A1*   10/2004   Kall et al. ................ 455/456.1
2005/0032532 A1*   2/2005    Kokkonen et al. ......... 455/456.6
(Continued)

FOREIGN PATENT DOCUMENTS

CN           1642345          7/2005
CN          101335918        12/2008
(Continued)

OTHER PUBLICATIONS

Extended European Search Report for EP 12844400.7, Completed by the European Patent Office, Dated Aug. 8, 2014, 7 Pages.
(Continued)

*Primary Examiner* — Leon Flores
(74) *Attorney, Agent, or Firm* — Brooks Kushman P.C.

(57) ABSTRACT

A method is provided for acquiring a user location including, when it is required to acquire a current user location, a Location Service Client (LSC) transmitting a location service request carrying a user bearer identifier of user to a Bearer Mapping Function (BMF) through a Gateway Mobile Location Centre (GMLC), and after receiving the location service request, the BMF searching for a corresponding Interworking Packet Access Gateway (iPAG) according to the user bearer identifier, and after obtaining user location information from the iPAG, the BMF returning the user location information to the LSC through the GMLC or instructing the GMLC to obtain the user location information from the iPAG.

10 Claims, 4 Drawing Sheets

(51) Int. Cl.
  *H04W 64/00* (2009.01)
  *H04W 92/04* (2009.01)

(56) References Cited

U.S. PATENT DOCUMENTS

| | | | |
|---|---|---|---|
| 2005/0272440 A1* | 12/2005 | Li | 455/456.1 |
| 2008/0133762 A1* | 6/2008 | Edge et al. | 709/228 |
| 2008/0139218 A1 | 6/2008 | Duan | |
| 2013/0023288 A1 | 1/2013 | Cheng | |

FOREIGN PATENT DOCUMENTS

| | | |
|---|---|---|
| CN | 101867907 | 10/2010 |
| CN | 102056151 | 5/2011 |
| EP | 2214451 | 8/2010 |
| WO | 2004004394 | 1/2004 |
| WO | 2011005516 | 1/2011 |

OTHER PUBLICATIONS

Akundi et al. Emergency Services Interconnection Forum, Feb. 2007, 48 Pages, "Location Acquisition and Location Parameter Conveyance for Internet Access."

3GPP TS 23.271 V10.2.0, Mar. 2011, 169 Pages, "3rd Generation Partnership Project; Technical Specification Group Services and System Aspects; Functional stage 2 description of Location Services (LCS) (Release 10)."

International Search Report for PCT/CN2012/082566, English translation attached to original, Both completed by the Chinese Patent Office on Dec. 24, 2012, All together 5 Pages.

* cited by examiner

SYSTEM AND METHOD FOR ACQUIRING USER LOCATION THROUGH USER BEARER IDENTIFIER

CROSS-REFERENCE TO RELATED APPLICATION

This application is the U.S. national phase of PCT Application No. PCT/CN12/082566 filed on Oct. 08, 2012, which claims priority to Chinese Patent Application No. 201110325808.3 filed on Oct. 24, 2011, the disclosures of which are incorporated in their entirety by reference herein.

TECHNICAL FIELD

The patent document relates to the field of packet communication technologies, and in particular, to a system and method for acquiring a user location through a user bearer identifier.

BACKGROUND OF THE RELATED ART

The Packet Switching (PS) access network includes a Long Term Evolution (LTE for short) network, a Universal Mobile Telecommunications System (UMTS for short) network, a GSM EDGE radio access network (GERAN for short), a Code Division Multiple Access (CDMA for short) network and so on, which provides Internet Protocol (IP) access capability to users, thereby enabling the users to access the Internet network.

Figure 1:
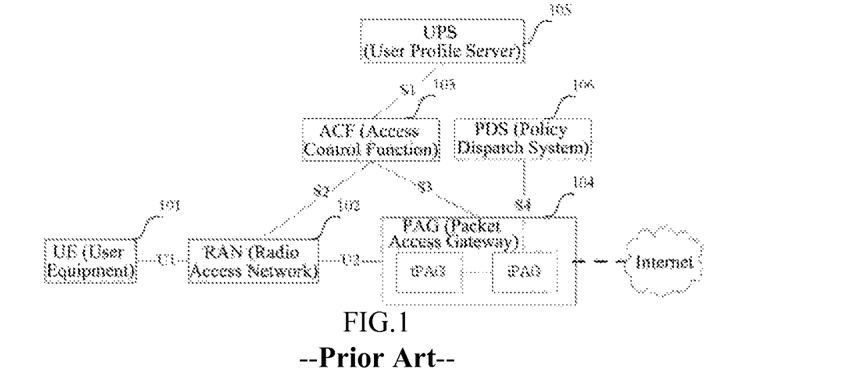
FIG. 1 is a diagram of architecture of a packet access network.

FIG. 1 is a diagram of architecture of an existing packet access network. The packet access network primarily includes a User Equipment (UE for short) 101, a Radio Access Network (RAN for short) 102, an Access Control. Function (ACF for short) 103, a Packet Access Gateway (PAG for short) 104, a User Profile Server (UPS for short) 105, and may also include a Policy Dispatch System (PDS) etc.

The UE 101 is used to receive and transmit wireless information, presenting services to users, and it can cooperate with the ACF to provide information required by the location services;

the RAN 102 is used to receive and transmit wireless information, and interact with the ACF and PAG, to enable the ACF to exchange control plane information with the UE and enable the PAG to exchange user plane data with the UE, and it can cooperate with the UE to provide location information to the ACF;

the ACF 103 is used to acquire user profile from the UPS, provide mobility management and bearer control to the user, and it can further exchange location information with the RAN and the UE to acquire the location information and provide location information to the LSC through the GMLC. Specifically, for example, the ACF is a Mobility Management Entity (MME for short) in the LTE network or a Serving GPRS Support Node (SGSN for short) in the UMTS network;

the PAG 104 is used to provide a bearer to implement exchange of user plane data. For a certain service or all services, the PAG includes one-stage or multi-stage packet data exchange gateway. The so-called "one-stage" refers to that for a certain service or all services, the RAN can implement packet data exchange with the Internet only through one PAG. The so-called "multi-stage" refers to that for a certain service or all services, the RAN can implement packet data exchange with the Internet through multiple (at least two) PAGs. Specifically, the PAG of the last stage which provides an interactive capability with the Internet is referred to as an Interworking Packet Access Gateway (iPAG for short), and former PAGs which provide the transfer capability are referred to as Transfer Packet Access Gateways (tPAG for short). Specifically, for example, the iPAG is a Public Data Network Gateway (PDN-GW for short) in the LTE network or a Gateway GPRS Support Node (GGSN for short) in the UMTS network, and for instance, the tPAG is a Service Gateway (SGW for short) in the LTE network or may also be an independent entity, such as a functional module of the ACF like the SGSN in the UMTS network;

the UPS 105 stores basic information of user and service subscription data, downloads user profile to the ACF and can acquire mobile information of user (the ACF where the user is located currently), thereby being able to cooperatively route a final call service request of the user to the ACF where the user is located currently. Specifically, the UPS may be a Home Subscriber Server (HSS for short), a Home Location Register (HLR for short), or an Authentication Authorization Accounting (AAA for short) in the mobile network.

The PDS 106 is used to receive service information from the UE and the application server, and on the basis of this, to generate a bearer policy to be distributed to the PAG so as to establish a suitable bearer, and the PAG may also report the packet access information to the PDS, and the PDS further distributes the packet access information to the application server. When the PDS is deployed, the Policy Dispatch Execution Agent (PDEA) of the PDS is set in the PAG. The PDEA may be an independent functional entity in the PAG and transfers signaling to the tPAG and/or iPAG in the PAG through an interface, or may be a logical function of the tPAG or iPAG.

Wherein, the interface U1 is an interface between the UE 101 and the RAN 102, which implements information interaction therebetween, including interaction of control plane information and user plane data; the U2 is an interface between the RAN 102 and the PAG 104, which carries user plane data of the UE; the U3 is a packet data interface from the PAG 104 to the Internet, which communicates with other Internet devices by using the IP protocol; the S1 is an interface between the ACF 103 and the UPS 105, which implements mobility management of the UE and download of the user profile; the S2 is an interface between the ACF 103 and the RAN 102, which carries control plane information of the UE and is used by the ACF 103 to acquire location information from the RAN 102 in a location service; and the S3 is an interface between the ACF 103 and the PAG 104, which controls the establishment and release of a user plane data channel etc.

Based on the current packet access network, an idea of identity and location separation can be further introduced, to construct a new type of Internet architecture, which is referred to as an identity network herein. The basic principle of the identity network is to allocate a fixed access identity to the UE, and the UE substitutes the IP address in the related art with the access identity for communication, and the iPAG located at the Internet edge allocates a routing identity to the user and uses the routing identity for routing, thereby implementing the mapping and conversion between the user access identity and routing identity.

Figure 2:
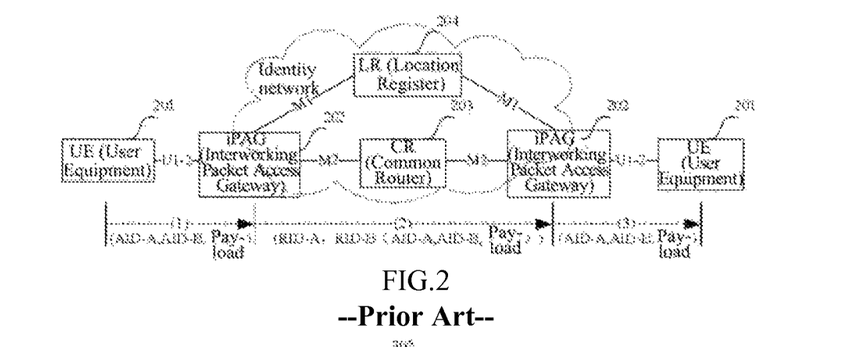
FIG. 2 is a diagram of architecture of an identity network.

FIG. 2 is a diagram of architecture of an identity network in the related art. As only the UE and the iPAG in the packet access network of FIG. 1 are involved in the data routing process of the identity network, network elements of the packet access network such as the RAN, the ACF and the UPS and so on are omitted in FIG. 2. The identity network illustrated in FIG. 2 includes a UE 201, an iPAG 202, a Common Router (CR for short) 203 and a Location Register (LR for short) 204, and description thereof are as follows.

The UE 201 accesses the Internet through the packet access network and substitutes the IP address with the user Access identity (AID for short) to be used as the source address of the IP data package to communicate with other user devices and application servers.

In addition to having the functions of the iPAG in FIG. 1, the iPAG 202 allocates a user AID to the user to take the place of the IP address when the UE establishes a packet data connection at the iPAG, and it further specifies a Routing Identity (RID for short) to establish a mapping relationship between the AID and the RID (AID, RID), and reports the mapping relationship to the LR; and in a process of communicating with a remote end, the iPAG can acquire the mapping relationship between the AID and RID of the remote UE from the LR according to the AID of remote end, or acquire the mapping relationship between the AID and the RID of the remote user from the received data package of the remote user, thereby implementing the processing and forwarding functions of the IP data packages according to the mapping relationship between the AID and RID of the local UE and remote UE.

The CR 103 implements calculation of the routing protocol, and forwards a data package to the iPAG where the destination UE is located according to the RID.

The LR 104 stores a mapping relationship between the AID and the RID reported by the iPAG, provides an inquiry function according to the mapping relationship, and returns a RID corresponding to the AID according to the AID in the inquiry request.

In the above architecture, the U1-2 is an interface between the UE 201 and the iPAG 202, i.e., a user plane interface from the UE to the PAG through the RAN in FIG. 1; the M1 is an interface between the iPAG 202 and the LR 204, which is used to report and inquire the mapping relationship between the AID and the RID; and the M2 is an interface between the iPAG 202 and the CR 203, which is used to forward data between the iPAGs.

When the UE-A transmits data to the UE-B, the UE-A constructs an IP data package {source address=AID-A, destination address=AID-B, payload} by using the access identity AID-A of itself as a source address and using the access identity AID-B of a correspondent node as a destination address, and transmits the IP data package to the iPAG-A; the iPAG-A uses the routing identity RID-A of the UE-A as the source address and uses the routing identity RID-B of the UE-B as the destination address according to the mapping relationship between the AID and the RID of the UE-A and UE-B, and routes original data package including the AID-A, AID-B and payload and so on as the payload of the newly constructed data package {source address=RID-A, destination address=RID-B, payload {AID-A, AID-B and original payload}} to the iPAG-B via the CR, wherein, the RID-B is acquired by the iPAG-A from the LR according to the identity AID-B of the UE-B; then the iPAG-B decapsulates the data package and restores the data package to the original data package transmitted by the UE-A {AID-A, AID-B, and payload} and transmits it to the UE-B.

It can be seen from the Internet access processes of FIGS. 1-2 that, the UE accesses an Internet service by using an IP address or an AID, and a remote end (for example, a map application server) can directly acquire the IP address or the AID from source address information of the data package, and such two identities are different from the commonly used application layer identities such as Mobile Subscriber International ISDN number (MSISDN, wherein the ISDN is an abbreviation of Integrated Service Digital Network), Session Initial Protocol Universal Resource Identifier (SIP URI), and the IP address or the AID belongs to the scope of a bearer network and they are therefore referred to as a user bearer identifier or a bearer identifier.

Figure 3:
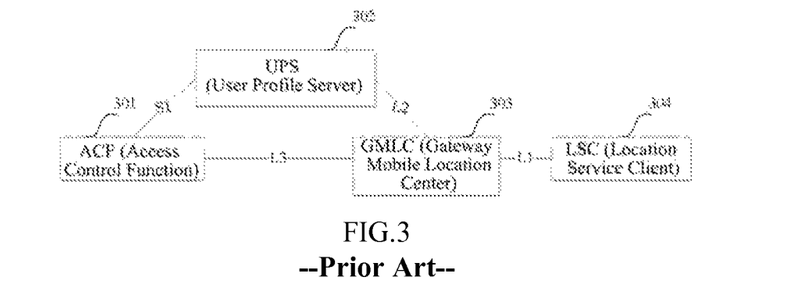
FIG. 3 is architecture of a location service of a packet access network and an identity network.

FIG. 3 is architecture of a location service of a packet access network and an identity network in the related art, which primarily comprises an ACF 301, an UPS 302, a Gateway Mobile Location Center (GMLC for short) 303, a Location Service Client (LSC for short) 304, and network elements such as UE, RAN, PSG, PDS and so on, which are not relevant herein, are omitted in the figure.

The GMLC 303 interacts with the ACF according to a request from the LSC, and acquire the location information of UE by interaction between the ACF and the RAN and UE, and returns the location information to the LSC, wherein, in the process of determining the ACF, it needs to acquire the ACF address where the user is located currently from the UPS. In the above location process, it only relates to the control plane network element ACF, the RAN and the UE in the packet access network, and does not relate to the user plane network element PAG. In the process of the GMLC acquiring location information through the ACF, the user is represented by using an identity of the user in the packet access network, which may be the MSISDN or IMSI or the both. The above identity is also referred to as an internal identity of the location service.

The LSC 304 requests the location information of the user from the GMLC by using the user identity according to the requirements of the application, wherein the user identity includes real identities of the user such as MSISDN, Session Initial Protocol Universal Resource Identifier (SIP URI) and so on, or the user identity may be an anonymous application layer identity. If it is an anonymous identity, it is required to add a corresponding entity between the LSC and the GMLC, to ensure the conversion between the anonymous identity and the real identity. The above identity is also referred to as an external identity of the location service. Specifically, the LSC is generally an application server in the network, for example, a map application server.

In FIG. 3, the L1 is an interface between the LSC 304 and the GMLC 303, which is used for LSC 304 requesting location information from the GMLC 303; the L2 is an interface between the GMLC 303 and the UPS 302, which is used by the GMLC 303 to acquire address information of the control plane network element ACF from the UPS 302; and the L3 is an interface between the GMLC 303 and the ACF 301, which is used by the GMLC 303 to acquire location information from the ACF 301.

A typical location service process is that the LSC 304 requests location information of a specified UE from the GMLC 303 through the L1 interface, and the GMLC 303 inquires the UPS 302 for the address of the control plane network element ACF where the user is located currently through the L2 interface, and inquires the control plane network element ACF 301 through the L3 interface according to the result returned by the UPS 302, and the ACF 301 may further inquire the UPS 302 for the location information of the user through the S1 interface and returns the location information to the GMLC 303, and then the GMLC 303 returns the result to the LSC 304.

In the related art, the LSC must firstly acquire the application layer identity of the user (real identity or anonymous identity), and then requests location service information from the GMLC by using the external identity of the above application layer, and the GMLC maps the external identity to the internal identity of the packet access network and then acquires the location of the user by using the interaction between the internal identity and the UPS and ACF. However, in the actual service, when a user accesses an Internet service through a packet access network, for example, the user accesses an application server of a map application provider on the Internet, it needs to acquire accurate user location information and provide service information such as adjacent map information and hotels and so on to the user according to the location information. As the UE uses the IP address or AID to interact with the application server, the application server may directly acquire a user bearer identifier of the user (IP address or AID) from a header of the data package at this time, but the accurate external identity of the application layer of the user may not be acquired, which causes that the application server is not able to use the location service provided by the packet mobile access network, thus limiting the application scope of the location service.

SUMMARY OF THE INVENTION

The technical problem to be solved by the patent document is to provide a system and method for acquiring user location information through a user bearer identifier, which solve the problem in the related art that the location information of UE can not be acquired by using the user bearer identifier, and satisfy the requirements of the Internet location service.

The patent document provides a method for acquiring a user location, comprising:

when it is required to acquire a current user location, the LSC transmitting a location service request to a Bearer Mapping Function (BMF) through a Gateway Mobile Location Centre (GMLC), wherein the location service request carries a user bearer identifier of the user; and after receiving the location service request, the BMF searching for a corresponding iPAG according to the bearer identifier, and after obtaining the user location information from the iPAG, the BMF returning the user location information to the LSC through the GMLC or instructing the GMLC to obtain the user location information from the iPAG.

Preferably, the BMF is a Location Register (LR), and the user bearer identifier carried in the location service request transmitted by the LSC is an Access Identity (AID); and after receiving the location service request, the LR inquires a mapping relationship between the AID and a Routing Identity (RID) which is stored locally according to the carried AID, determining a Routing Identity RID corresponding to the iPAG where the data connection is located, then the LR transmits the location service request to the iPAG according to the RID, which carries the AID, and when receiving the user location information returned by the iPAG, the LR returns the user location information to the LSC through the GMLC.

Preferably, the BMF is an LR, and the user bearer identifier carried in the location service request transmitted by the LSC is an AID; and after receiving the location service request, the LR inquires a mapping relationship between the AID and a RID which is stored locally according to the carried AID, determining a RID corresponding to the iPAG where the data connection is located, and then the LR returns a redirection response to a GMLC, which carries the RID, and the GMLC transmits the location service request again to the iPAG according to the RID, which carries the AID, and after receiving the user location information returned by the iPAG, the GMLC returns the user location information to the LSC.

Preferably, the BMF is a PDS, and the user bearer identifier carried in the location service request transmitted by the LSC is an AID or an IP address; and the PDS determines a corresponding data connection according to the user bearer identifier carried in the location request, and determines the iPAG by acquiring an iPAG address from the data connection information, and then transmits a location service request to the iPAG, which carries any one or more of the following identities: a user bearer identifier, a data connection identity and a user identity; and after receiving the user location information returned by the iPAG, the PDS transmits a location service response to the LSC through the GMLC, which carries the current user location information.

Preferably, the BMF is a PDS, and the user bearer identifier carried in the location service request transmitted by the LSC is an AID or an IP address; and the PDS determines a corresponding data connection according to the user bearer identifier carried in the location request, acquires an iPAG address from the data connection information and then returns a redirection response to the GMLC, which carries an iPAG address, instructing the GMLC to inquire the user location information from the iPAG, and after receiving the redirection response, the GMLC transmits a location service request to the iPAG, which carries a user bearer identifier, and after receiving the user location information returned by the iPAG, the GMLC returns the user location information to the LSC.

Preferably, the BMF is a PDS, and the user bearer identifier carried in the location service request transmitted by the LSC is an AID or an IP address; and the PDS determines a corresponding data connection according to the user bearer identifier carried in the location request, and acquires an iPAG address from the data connection information, and then transmits a redirection response to the GMLC, instructing the GMLC to inquire the user location information from the iPAG, which carries the iPAG address and any one of the following identities: a data connection identity and a user identity; and after receiving the redirection response, the GMLC transmits a location service request to the iPAG, which carries any of the following identities: a user bearer identifier, a data connection identity and a user identity, and after receiving the user location information returned by the iPAG, the GMLC returns the user location information to the LSC.

Preferably, after receiving the location service request, the iPAG searches whether there is user location information stored locally, and if yes, the iPAG returns the user location information to the BMF or GMLC, and if no, the iPAG acquires the current user location information from an Access Control Function (ACF) and returns the current user location information to the BMF or GMLC.

Preferably, when the iPAG does not stores the user location information locally, the iPAG transmits a location service request to the ACF through a Transfer Packet Access Gateway (tPAG) or transmits the location service request to the ACF directly, wherein, an identity carried in the location service request is one or more of identities in the received location service request; and after receiving the location service request, the ACF acquires the user location information and returns the user location information to the iPAG.

Preferably, the method further comprises: after detecting a change of the user location, the ACF notifying the iPAG of information about the changed user location directly through a control interface S3 between the ACF and the iPAG or indirectly through the tPAG.

Preferably, the method further comprises: after detecting a change of the user location, a Radio Access Network (RAN) notifying the iPAG of information about the changed user location directly through a user plane interface U2 between the RAN and the PAG or notifying the iPAG of the information about the changed user location indirectly through the tPAG.

The patent document further provides a system for acquiring a user location, comprising a LSC, a GMLC, a BMF and an iPAG, wherein, the LSC is configured to: when it is required to acquire a current user location, transmit a location service request to the GMLC, which carries a user bearer identifier of the user;

the GMLC is configured to transmit the received location service request to the BMF; transmit the location information returned by the BMF to the LSC, or transmit the location service request to the iPAG according to a redirection response of the BMF and transmit the location information returned by the iPAG to the LSC;

the BMF is configured to search for a corresponding iPAG according to the bearer identifier after receiving the location service request, and return the user location information obtained from the iPAG to the LSC through the GMLC or instruct the GMLC to obtain the user location information from the iPAG; and the iPAG is configured to return the user location information to the BMF or the GMLC.

Preferably, the BMF is an LR, and the user bearer identifier carried in the location service request transmitted by the LSC is an AID; and the LR is configured to: after receiving the location service request, inquire a mapping relationship between the AID and a RID which is stored locally according to the carried AID and determine a RID corresponding to the iPAG where the data connection is located, then transmit the location service request to the iPAG according to the RID, which carries the AID, and when receiving the user location information returned by the iPAG, return the user location information to the LSC through the GMLC.

Preferably, the BMF is an LR, and the user bearer identifier carried in the location service request transmitted by the LSC is an AID;

the LR is configured to: after receiving the location service request, inquire a mapping relationship between the AID and a RID which is stored locally according to the carried AID, determine a RID corresponding to the iPAG where the data connection is located, and then return a redirection response to a GMLC, which carries the RID; and the GMLC is configured to transmit the location service request again to the iPAG according to the RID, which carries the AID, and after receiving the user location information returned by the iPAG, return the user location information to the LSC.

Preferably, when the BMF is a PDS, and the user bearer identifier carried in the location service request transmitted by the LSC is an AID or an IP address; and the PDS is configured to determine a corresponding data connection according to the user bearer identifier carried in the location request, and determine the iPAG by acquiring an iPAG address from the data connection information, and then transmit a location service request to the iPAG, which carries any one or more of the following identities: a user bearer identifier, a data connection identity and a user identity; and the PDS is further configured to: after receiving the user location information returned by the iPAG, transmit a location service response to the LSC through the GMLC, which carries the current user location information.

Preferably, the BMF is a PDS, and the user bearer identifier carried in the location service request transmitted by the LSC is an AID or an IP address;

the PDS is configured to determine a corresponding data connection according to the user bearer identifier carried in the location request, acquire an iPAG address from the data connection information, and then transmit a redirection response to the GMLC, which carries an iPAG address; and the GMLC is configured to transmit a location service request to the iPAG according to an iPAG address in the redirection response, which carries a user bearer identifier.

Preferably, the BMF is a PDS, and the user bearer identifier carried in the location service request transmitted by the LSC is an AID or an IP address;

the PDS is configured to determine a corresponding data connection according to the user bearer identifier carried in the location request, and acquire an iPAG address from the data connection information, and then transmit a redirection response to the GMLC, which carries the iPAG address and a data connection identity and/or a user identity; and the GMLC is configured to transmit a location service request to the iPAG according to an iPAG address in the redirection response, which carries any one or more of the following identities: a user bearer identifier, a data connection identity and a user identity.

Preferably, the system further comprises an ACF; and the iPAG is configured to: after receiving the location service request, search whether there is user location information stored locally, and if yes, return the user location information to the BMF or the GMLC, and if no, acquire the current user location information from the ACF and return the current user location information to the BMF or the GMLC.

Preferably, the iPAG is configured to acquire the current user location information from the ACF by:

the iPAG transmitting a location service request to the ACF through a tPAG or transmits a location service request to the ACF directly, wherein, an identity carried in the location service request is one or more of identities carried in the received location service request; and the ACF is configured to return the acquired user location information to the iPAG.

Preferably, the ACF is further configured to: after detecting a change of the user location, notify the iPAG of information about the changed user location directly through a control interface S3 between the ACF and the iPAG or indirectly through the tPAG.

Preferably, the system further comprises a RAN, configured to: after detecting a change of the user location, notify the iPAG of information about the changed user location directly through a user plane interface U2 between the RAN and the PAG or notify the iPAG of information about the changed user location indirectly through the tPAG.

In conclusion, the embodiments of the present invention provide a system and method for acquiring a user location through a user bearer identifier, which can solve the problem that the location information of UE can not be acquired by using the user bearer identifier, and satisfy the requirements of the Internet location service.

PREFERRED EMBODIMENTS OF THE PRESENT INVENTION

The embodiments of the present invention provide a system and method for acquiring user location information through a user bearer identifier. When it is required to acquire a current user location, the LSC transmits a location service request to a BMF through a GMLC, which carries a user bearer identifier of the user; and after receiving the location service request, the BMF searches for a corresponding iPAG according to the bearer identifier, and after obtaining the user location information from the iPAG, the BMF returns the user location information to the LSC through the GMLC or instructs the GMLC to obtain the user location information from the iPAG.

System Embodiment

Figure 4:
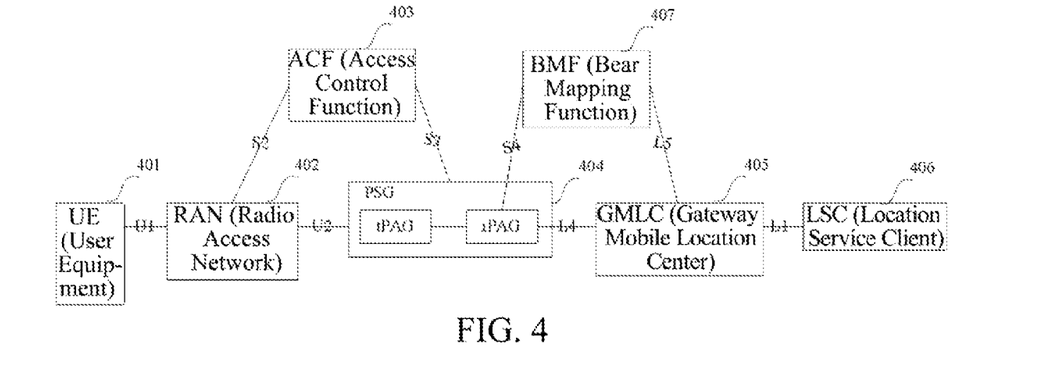
FIG. 4 is a diagram of network architecture of acquiring user location information through a user bearer identifier according to an embodiment of the present invention.

The embodiment of the present invention provides a system for acquiring a user location through a user bearer identifier, as shown in FIG. 4, comprising: a LSC, a GMLC, a Bear Mapping Function (BMF for short) and an iPAG; based on FIGS. 1-3, the system adds a BMF 407, and also adds an interface L5 between the GMLC 405 and the BMF and an interface L4 between the GMLC 405 and the iPAG 404, wherein the BMF 407 may be a PDS in the packet access network or an LR in the identity network, and there are also corresponding enhancements in functions of the iPAG 404, the GMLC 405, the ACF 403 and the LSC 406.

Specifically, the LSC is configured to acquire a user bearer identifier (an IP address or an AID) from the packet data package from the UE and to transmit a location service request to the GMLC, which carries a user bearer identifier, when it is required to acquire the current user location;

the GMLC is configured to receive the location service request transmitted by the LSC, transmit the location service request to the BMF by using the user bearer identifier and transmit the location information returned by the BMF to the LSC, or transmit the location service request to the iPAG according to a redirection response of the BMF and transmit the location information returned by the iPAG to the LSC;

the BMF is configured to inquire local data for an iPAG corresponding to the user bearer identifier according to the user bearer identifier when receiving the location service request from the GMLC, then transmit the location service request to the iPAG, and return the location information returned by the iPAG to the GMLC or return the address information of the iPAG to the GMLC; and the iPAG is configured to acquire the location information corresponding to the user bearer identifier stored locally when receiving a location service request from the BMF or the GMLC, and if there is no corresponding location information, inquire the ACF for the location information of UE, and return the location information to the BMF or the GMLC.

Furthermore, the BMF is an LR, and the user bearer identifier carried in the location service request transmitted by the LSC is an AID; and the LR is configured to: after receiving the location service request, inquire a mapping relationship between the AID and the RID which is stored locally according to the carried AID and determine a RID corresponding to the iPAG where the data connection is located, then transmit the location service request to the iPAG according to the RID, which carries the AID, and after receiving the user location information returned by the iPAG, return the user location information to the LSC through GMLC.

Furthermore, the BMF is an LR, and the user bearer identifier carried in the location service request transmitted by the LSC is an AID; and the LR is configured to: after receiving the location service request, inquire a mapping relationship between the AID and the RID which is stored locally according to the carried AID, determine a RID corresponding to the iPAG where the data connection is located, and then return a redirection response to a GMLC, which carries the RID; and the GMLC is configured to transmit the location service request again to the iPAG according to the RID, which carries the AID, and after receiving the user location information returned by the iPAG, return the user location information to the LSC.

Furthermore, when the BMF is a PDS, and the user bearer identifier carried in the location service request transmitted by the LSC is an AID or an IP address;

the PDS is configured to determine a corresponding data connection according to the user bearer identifier carried in the location request, and determine the iPAG by acquiring an iPAG address from the data connection information, and then transmit a location service request to the iPAG, which carries any one or more of the following identities: a user bearer identifier, a data connection identity and a user identity; and the PDS is further configured to: after receiving the user location information returned by the iPAG, transmit a location service response to the LSC through the GMLC, which carries the current user location information.

Furthermore, the BMF is a PDS, and the user bearer identifier carried in the location service request transmitted by the LSC is an AID or an IP address;

the PDS is configured to determine a corresponding data connection according to the user bearer identifier carried in the location request, acquire an iPAG address from the data connection information, and then transmit a redirection response to the GMLC, which carries an iPAG address; and the GMLC is configured to transmit a location service request to the iPAG according to an iPAG address in the redirection response, which carries the user bearer identifier.

Furthermore, the BMF is a PDS, and the user bearer identifier carried in the location service request transmitted by the LSC is an AID or an IP address;

the PDS is configured to determine a corresponding data connection according to the user bearer identifier carried in the location request, and acquire an iPAG address from the data connection information, and then transmit a redirection response to the GMLC, which carries the iPAG address and a data connection identity and/or a user identity; and the GMLC is configured to transmit a location service request to the iPAG according to an iPAG address in the redirection response, which carries any one or more of the following identities: a user bearer identifier, a data connection identity and a user identity.

Furthermore, the system further comprises an ACF; and the iPAG is configured to: after receiving the location service request, search whether there is user location information stored locally, and if yes, return the user location information to the BMF or the GMLC, and if no, acquire the current user location information from the ACF and return the current user location information to the BMF or the GMLC.

Furthermore, the iPAG is configured to acquire the current user location information from the ACF by:

the iPAG transmitting a location service request to the ACF through the tPAG or transmits the location service request to the ACF directly, wherein an identity carried in the location service request is one or more of identities carried in the received location service request; and the ACF is configured to return the acquired user location information to the iPAG.

Furthermore, the ACF is further configured to: after detecting a change of the user location, notify the iPAG of information about the changed user location directly through a control interface S3 between the ACF and the iPAG or indirectly through the tPAG.

Furthermore, the system further comprises a RAN, configured to: after detecting a change of the user location, notify the iPAG of information about the changed user location directly through a user plane interface U2 between the RAN and the PAG or notifying the iPAG of information about the changed user location indirectly through the tPAG.

In the architecture as shown in FIG. 4, the L4 interface is an interface between the GMLC 404 and the iPAG 403, which is used by the GMLC to directly inquire the iPAG for the location information, and the L5 interface is an interface between the GMLC 404 and the BMF 407, which is used by the GMLC to request the location service from the LR by using the user bearer identifier.

Method Embodiment

Figure 5:
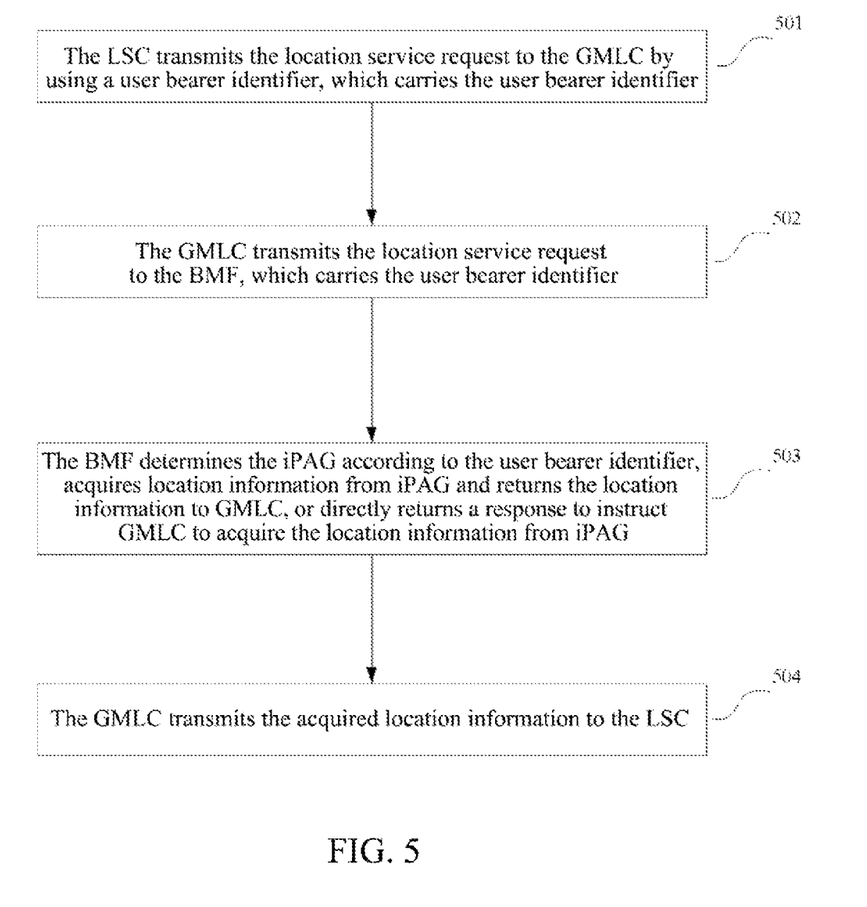
FIG. 5 is a flowchart of a method embodiment of the present invention.

The embodiment provides a method for acquiring a user location through a user bearer identifier, as shown in FIG. 5, comprising the following steps.

In step 501, the LSC transmits the location service request to the GMLC by using a user bearer identifier; wherein, the location service request carries a user bearer identifier as an external identity of the location service.

In step 502, the GMLC transmits the location service request to the BMF, which carries the user bearer identifier;

in step 503, the BMF determines the iPAG according to the user bearer identifier, acquires location information from the iPAG and returns the location information to the GMLC, or directly returns a response to instruct GMLC to acquire the location information from the iPAG;

wherein, the BMF may be a PDS in the packet access network or an LR in the identity network.

When the BMF is a PDS and a data connection is established between the UE and the iPAG, the iPAG reports information of the data connection to the PDS, including information such as a bearer identifier of the UE (an IP address or an AID), a user identity of the UE (an MSISDN and/or an IMSI), a data connection identity, an iPAG address etc. When the PDS receives the location service request from the GMLC, a corresponding data connection is determined according to the user bearer identifier carried in the location request, to acquire the iPAG address, and then the location service request is transmitted to the iPAG, which carries any one or more of the following identities: a user bearer identifier, a data connection identity or a user identity; or the PDS returns a redirection response to the GMLC, which carries an iPAG address, instructing the GMLC to inquire the iPAG for the location information of UE, and the redirection response may further carry the data connection identity and the user identity; and then the GMLC directly transmits the location service request to the iPAG.

When the BMF is an LR and a data connection is established between the UE and the iPAG, the iPAG will report a mapping relationship between the AID and the RID to the LR. When the LR receives the location service request from the GMLC, the LR inquires a mapping relationship between the AID and the RID which is stored locally according to the AID carried in the location request and determines a RID corresponding to the iPAG where the data connection is located, and then transmits the location service request to the iPAG according to the RID, which carries the AID, or the LR directly returns the RID to the GLMC, and the GLMC transmits the location service request again to iPAG according to the RID.

After the iPAG receives a location service request from the BMF or the GMLC, the iPAG inquires for the location information of UE which is stored locally according to the user bearer identifier, or the data connection identity or the user identity carried in the request, wherein the location information of UE is primarily wireless location cell information. If there is no location information of UE locally, the iPAG may further inquire the ACF or inquire the ACF through the tPAG for the location information of UE, and the ACF acquires the current location information of UE by interaction with the RAN and UE, and then returns the current location information of UE to the iPAG directly or through the tPAG.

The method of the iPAG acquiring the location information of UE includes any of the following modes:

1) the iPAG inquiring the ACF or inquiring the ACF through the tPAG for the location information of UE;

2) the ACF detecting a change of the UE location, and notifying the iPAG directly through a control interface S3 between the ACF and the iPAG or indirectly through the tPAG;

3) the RAN detecting a change of the UE location, and notifying the iPAG directly through a user plane interface U2 between the RAN and the PAG or indirectly through the tPAG;

After the location information of UE is acquired through the above modes 2) or 3), the iPAG stores the location information of UE locally, and then after receiving the location service request, the iPAG can directly search for the location information of UE locally and return the location information of UE to a requesting party.

In step 504, the GMLC transmits the acquired location information to the LSC.

The contents of the patent document will be further described below by several application examples.

Application Example One

Figure 6:
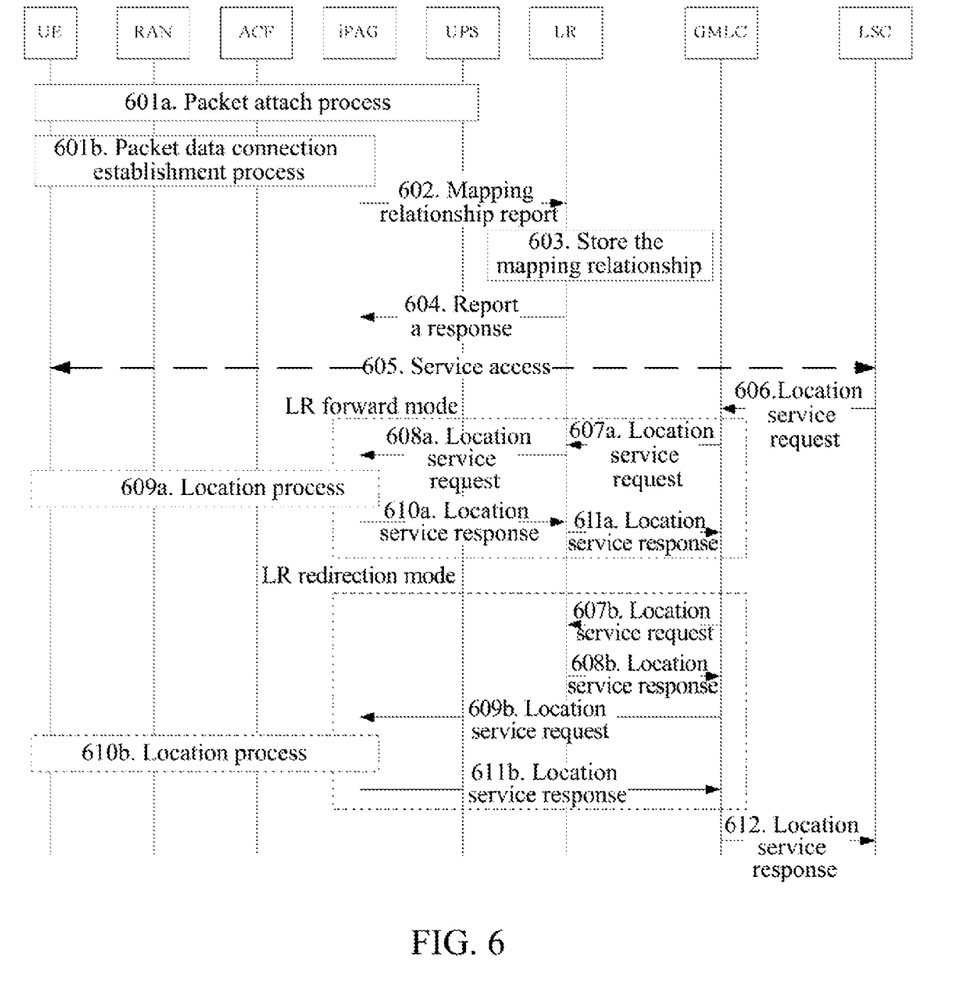
FIG. 6 is a flowchart of a method for acquiring user location information through an LR in an identity network in application example one of the present invention.

As shown in FIG. 6, it is a flowchart of a method of acquiring user location information through an LR in an identity network according to an embodiment of the present invention. The embodiment describes a method of GMLC acquiring the location information of UE from an iPAG through an LR when the BMF is the LR. The flowchart of the method comprises the following steps.

In step 601a, a UE performs a packet attach process and transmits an attach request to the ACF through a RAN, and the ACF further transmits an attach request to an UPS, and the UPS accepts the attach request of user and downloads user profile to the ACF;

in step 601b, according to a request from the UE, a process of establishing a packet data connection is performed, and the ACF controls the iPAG to establish the packet data connection between the UE and the iPAG;

In the above process, a process of allocating an AID will be performed, and the specific allocation process may be as follows:

1) the UE configuring the AID locally;

2) configuring the AID at the UPS, and downloading the AID along with the user profile to the ACF, the ACF controlling the iPAG to transmit the AID to the iPAG when creating a data connection session, and then the iPAG allocating the AID to the UE;

3) configuring the AID in the Authentication Authorization Accounting server, and when creating a data connection, the iPAG acquiring the AID from the Authentication Authorization Accounting server through an internal identity (an MSISDN and/or an IMSI), and then the iPAG allocating the AID to the UE.

According to different access technologies, steps 601a and 601b may be performed in the same process, or may also be performed independently at different moments.

In step 602, the iPAG transmits a report message of the mapping relationship to the LR, and reports the mapping relationship between the AID and the RID to the LR;

in step 603, the LR stores the mapping relationship between the AID and the RID;

in step 604, the LR returns a report response of the mapping relationship to the iPAG;

in step 605, after implementing the establishment of the packet data connection, a user can use the UE to access an Internet service, and at this time, a source address of the packet data package is an AID, and assuming that the application server is a LSC here, the LSC can acquire the AID of the user from the packet data package from the UE;

in step 606, when it is required to acquire the current UE location, the LSC transmits a location service request to the GMLC, which carries a user bearer identifier (i.e., the AID of the UE) as an external identity of a location service;

the GMLC transmits a location service request to the LR, and there are two processing modes for the LR, i.e., a direct inquiry mode of LR forward illustrated in steps 607a~611a may be used, or an indirect inquiry mode of LR redirection illustrated in steps 607b~611b may also be used.

Figure 8:
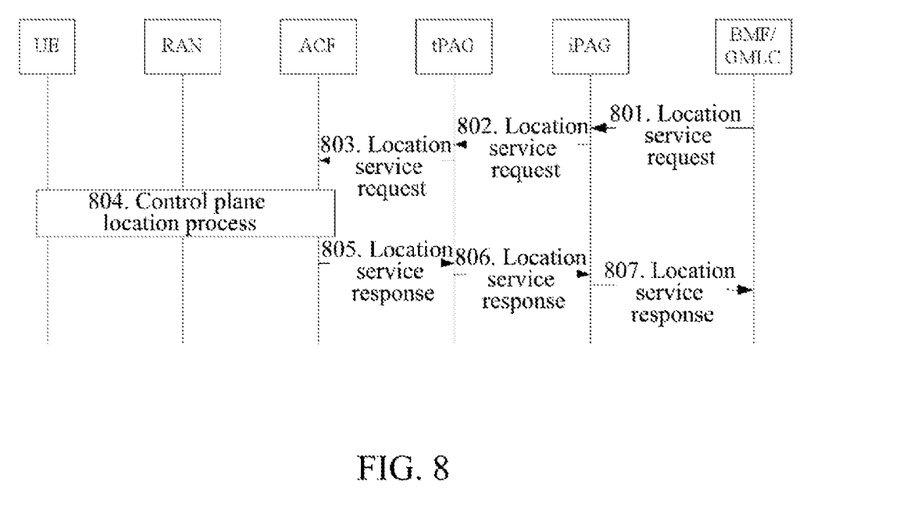
FIG. 8 is a flowchart of an iPAG location process in application example three of the present invention.

The direct inquiry process of LR forward is as follows:

in step 607a, the GMLC transmits a location service request to the LR, which carries an AID;

in step 608a, the LR inquires a mapping relationship between the AID and the RID according to the AID to acquire a RID, and then transmits the location service request to the iPAG according to the RID;

in step 609a, if there is location information of UE locally in the iPAG, step 610a is performed, and the location information of UE is directly returned to the LR; otherwise, the iPAG performs a location process described in FIG. 8 to acquire the location information of UE;

in step 610a, the iPAG returns a location service response to the LR, which carries the location information of UE;

in step 611a, the LR returns a location service response to the GMLC, which carries the location information of UE;

or the indirect inquiry process of LR redirection is as follows:

in step 607b, the GMLC transmits a location service request to the LR, which carries an AID;

in step 608b, the LR inquires a mapping relationship between the AID and the RID according to the AID to acquire a RID, and then the LR returns a redirection response, which carries the RID, indicating the GMLC to inquire a network element indicated by the RID;

in step 609b, the GMLC transmits the location service request to the iPAG according to the RID, which carries the AID;

in step 610b, if there is location information of UE locally in the iPAG, step 611b is performed, and the location information of UE is returned directly to the LR; otherwise, the location process described in FIG. 8 is performed by the iPAG, to acquire the location information of UE;

in step 611b, the iPAG returns the location service response to the GMLC, which carries the location information of UE;

in step 612, the GMLC returns the location service response to the LSC, which carries the current location information of UE.

Application Example Two

Figure 7:
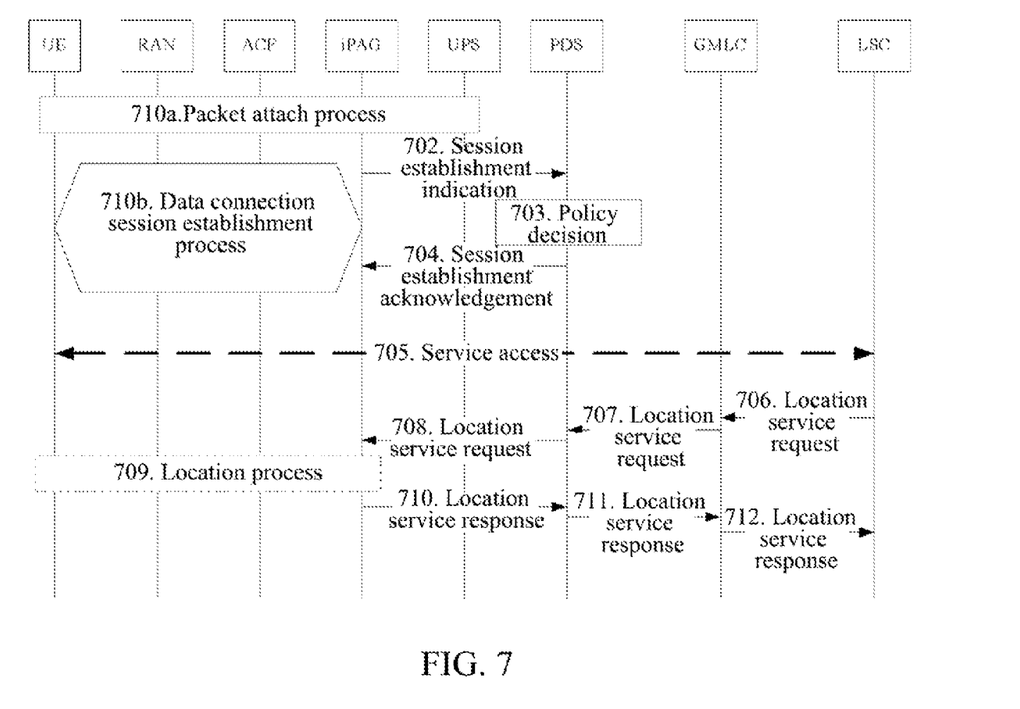
FIG. 7 is a flowchart of a method for acquiring user location information through a PDS in a packet access network in application example two of the present invention.

As shown in FIG. 7, it is a flowchart of a method for acquiring user location information through a PDS in a packet access network according to an embodiment of the present invention. The embodiment describes a method for a GMLC acquiring location information of UE from an iPAG through a PDS when the BMF is the PDS, which is also applied to an identity network based on the packet access network and supporting the PDS network. The process of the method includes the following steps.

In step 701a, the UE performs a packet attach process and transmits an attach request to the ACF through the RAN, and the ACF further transmits the attach request to the UPS, and the UPS accepts the attach request of user and downloads the user profile to the ACF;

in step 701b, a process of establishing a packet data connection is performed according to a request from the UE, and the ACF controls the iPAG to establish a packet data connection between the UE and the iPAG;

The difference from FIG. 5 is that if the iPAG supports an identity network, an AID is allocated to the UE; otherwise, an IP address is allocated.

According to different access technologies, steps 701a and 701b may be implemented in the same process, or may also be independently performed at different moments.

In step 702, the iPAG transmits a data connection session establishment notification message to the PDS, to report the established PDN connection information (or may also be referred to as data connection information) to the PDS, including a bearer identifier (an IP address or an AID), a user identity, a data connection identity, an address of the iPAG etc.;

in step 703, the PDS records data connection information (i.e. PDN connection information), and performs a data connection policy decision process, and generates a control policy corresponding to the data connection, such as a quality of service strategy, a data package control list and so on, according to the data connection information, user subscription, operator policy;

in step 704, the PDS returns a session establishment acknowledgement message to the iPAG, which carries a generated control policy;

in step 705, after implementing the establishment of the packet data connection, a user can use the UE to access an Internet service, and at this time, a source address of the packet data package is an IP address or an AID, and assuming that the application server is an LSC here, the LSC can acquire the user bearer identifier (an IP address or an AID) from the packet data package from the UE;

in step 706, when it is required to acquire a current UE location, the LSC transmits a location service request to the GMLC, which carries the user bearer identifier of the UE (an IP address or an AID) as an external identity of the location service;

in step 707, the GMLC transmits the location service request to the PDS, which carries the user bearer identifier of the UE;

in step 708, the PDS inquires the data connection information recorded in step 703 for an iPAG corresponding to the user bearer identifier according to the user bearer identifier of UE, and then transmits a location service request to the iPAG, which carries any one or more of the following identities: a user bearer identifier of the UE, a data connection identity and a user identity (an MSISDN, an IMSI);

in step 709, if the iPAG determines a data connection and a corresponding UE according to any identity carried in the location service request and finds that there is location information of UE locally, step 710 is performed, and the location information of UE is directly returned to the PDS; otherwise, the iPAG performs the location process illustrated in FIG. 8 to acquire the location information of UE;

in step 710, the iPAG transmits a location service response to the PDS, which carries the location information of UE;

in step 711, the PDS returns a location service response to the GMLC, which carries the location information of UE;

in step 712, the GMLC returns the location service response to the LSC, which carries the current location information of UE.

The indirect inquiry process of redirection illustrated in FIG. 5 may also be used by the PDS to return a redirection response to the GMLC, indicating the GMLC to inquire the iPAG for the location information of UE, which carries an address of the iPAG and may further carry data connection identity and/or user identity; and the GMLC then directly transmits the location service request to the iPAG.

Application Example Three

As shown in FIG. 8, it is a flowchart of an iPAG location process according to an embodiment of the present invention. The embodiment describes a process of the iPAG needing to acquire current location information of UE from an ACF when the iPAG receives a location service request. The process of the method comprises the following steps.

In step 801, the iPAG receives a location service request from the BMF (an LR or a PDS) or a GMLC;

in step 802, if the iPAG finds that there is no location information of UE locally, the iPAG initiates a location process and transmits a location service request to the tPAG;

if a one-stage gateway mode is used, the iPAG directly transmits the location service request to the ACF;

when the iPAG receives the location service request transmitted by the LR, the iPAG includes the user bearer identifier in a location service request when transmitting the location service request to the tPAG; and when the iPAG receives a location service request transmitted by the PDS, the iPAG includes any of the following identities in a location service request when transmitting the location service request to the tPAG: a user bearer identifier of the UE, a data connection identity, a user identity (an MSISDN, an IMSI);

in step 803, the tPAG transmits a location service request to the control plane network element ACF;

in step 804, the ACF initiates a control plane location process by using an internal identity (an MSISDN or an IMSI), and acquires current location information of UE by interaction with the RAN and the UE;

a method of the ACF acquiring an internal identity comprises:

1) The iPAG carrying an internal identity in the location service request transmitted to the ACF, and the ACF acquiring the internal identity from the location service request;

2) The ACF acquiring the internal identity corresponding to the data connection locally through a data connection identity in the location service request.

In step 805, the ACF returns a location service response, which carries the location information of UE;

in step 806, the tPAG forwards the location service response to the iPAG;

In step 807, the iPAG transmits the location service response to the BMF or the GMLC, which carries the location information of UE.

Those of ordinary skill in the art can understand that all or a part of steps in the above method can be implemented by programs instructing related hardware, and the above programs can be stored in a computer readable storage medium, such as a read-only memory, disk or disc etc. Alternatively, all or a part of steps in the above embodiments can also be implemented by one or more integrated circuits. Accordingly, various modules/units in the above embodiments can be implemented in a form of hardware, or can also be implemented in a form of software functional module. The patent document is not limited to any particular form of a combination of hardware and software.

The above embodiments are only used to illustrate technical schemes of the patent document without limitation, and the patent document is merely described in detail with reference to preferred embodiments. Those of ordinary skill in the art should understand that modifications or equivalent substitutions can be made on the technical schemes of the patent document without departing from the spirit and scope of the technical schemes of the patent document, all of which should be contained within the scope of the claims of the patent document.

Industrial Applicability

The embodiments of the present invention provide a system and method for acquiring a user location through a user bearer identifier, which can solve the problem that the location information of UE can not be acquired by using the user bearer identifier and satisfy the requirements of the Internet location service.

What is claimed is:

1. A method for acquiring a user location, comprising:
when it is required to acquire a current user location, a Location Service Client (LSC) transmitting a location service request carrying a user bearer identifier of user to a Bearer Mapping Function (BMF) through a Gateway Mobile Location Centre (GMLC); and
after receiving the location service request, the BMF searching for a corresponding Interworking Packet Access Gateway (iPAG) according to the user bearer identifier, and after obtaining user location information from the iPAG, the BMF returning the user location information to the LSC through the GMLC or instructing the GMLC to obtain the user location information from the iPAG;
the BMF is a Policy Dispatch System (PDS), and the user bearer identifier carried in the location service request transmitted by the LSC is an AID or an IP address;
and the PDS determines a corresponding data connection according to the user bearer identifier carried in the location service request and determines the iPAG by acquiring an iPAG address from the data connection information, and then the PDS transmits a location service request to the iPAG, which carries any one or more of following identities: the user bearer identifier, a data connection identity and a user identity; and after receiving the user location information returned by the iPAG, the PDS transmits a location service response to the LSC through the GMLC, which carries current user location information; or
the PDS determines a corresponding data connection according to the user bearer identifier carried in the location service request and acquires an iPAG address from the data connection information, and then the PDS transmits a redirection response to the GMLC, which carries an iPAG address, instructing the GMLC to inquire the iPAG for the user location information, and after receiving the redirection response, the GMLC transmits the location service request to the iPAG, which carries a user bearer identifier, and after receiving the user location information returned by the iPAG, the GMLC returns the user location information to the LSC; or the PDS determines a corresponding data connection according to the user bearer identifier carried in the location service request and acquires an iPAG address from the data connection information, and then the PDS transmits a redirection response to the GMLC, instructing the GMLC to inquire the iPAG for the user location information, wherein the redirection response carries the iPAG address and any one of following identities: a data connection identity and a user identity; and after receiving the redirection response, the GMLC transmits a location service request to the iPAG, which carries any of following identities: the user bearer identifier, a data connection identity and a user identity, after receiving the user location information returned by the iPAG, the GMLC returns the user location information to the LSC.

2. The method according to claim 1, wherein, after receiving the location service request, the iPAG searches whether there is the user location information stored locally, and if yes, the iPAG returns the user location information to the BMF or GMLC, and if no, the iPAG acquires current user location information from an Access Control Function (ACF) and returns the current user location information to the BMF or GMLC.

3. The method according to claim 2, wherein, when the iPAG does not stores the user location information locally, the iPAG transmits a location service request to the ACF through a Transfer Packet Access Gateway (tPAG) or transmits a location service request to the ACF directly, wherein an identity carried in the location service request is one or more of identities in the received location service request; and after receiving the location service request, the ACF acquires the user location information and returns the user location information to the iPAG.

4. The method according to claim 3, further comprising:

after detecting a change of the user location, the ACF notifying the iPAG of information about the changed user location directly through a control interface S3 between the ACF and the iPAG or indirectly through the tPAG.

5. The method according to claim 3, further comprising:

after detecting a change of the user location, a Radio Access Network (RAN) notifying the iPAG of information about the changed user location directly through a user plane interface U2 between the RAN and the PAG or notifying the iPAG of information about the changed user location indirectly through the tPAG.

6. A system for acquiring a user location, comprising a Location Service Client (LSC), a Gateway Mobile Location Centre (GMLC), a Bearer Mapping Function (BMF) and an Interworking Packet Access Gateway (iPAG), wherein, the LSC is configured to: when it is required to acquire a current user location, transmit a location service request to the GMLC, which carries a user bearer identifier of user;

the GMLC is configured to transmit the received location service request to the BMF; transmit location information returned by the BMF to the LSC, or transmit the location service request to the iPAG according to a redirection response of the BMF and transmit location information returned by the iPAG to the LSC;

the BMF is configured to search for a corresponding iPAG according to the user bearer identifier after receiving the location service request, and return user location information obtained from the iPAG to the LSC through the GMLC or instruct the GMLC to obtain user location information from the iPAG; and the iPAG is configured to return the user location information to the BMF or the GMLC;

when the BMF is a Policy Dispatch System (PDS), and the user bearer identifier carried in the location service request transmitted by the LSC is an AID or an IP address; and the PDS is configured to determine a corresponding data connection according to the user bearer identifier carried in the location service request and determine the iPAG by acquiring an iPAG address from the data connection information, and then transmit a location service request to the iPAG, which carries any one or more of e following identities: the user bearer identifier, a data connection identity and a user identity; and the PDS is further configured to: after receiving the user location information returned by the iPAG, transmit a location service response to the LSC through the GMLC, which carries current user location information; or the PDS is configured to determine a corresponding data connection according to the user bearer identifier carried in the location service request, acquire an iPAG address from the data connection information, and then transmit a redirection response to the GMLC, which carries the iPAG address; and the GMLC is configured to transmit a location service request to the iPAG according to the iPAG address in the redirection response, which carries the user bearer identifier; or the PDS is configured to determine a corresponding data connection according to the user bearer identifier carried in the location service request, and acquire an iPAG address from the data connection information, and then transmit a redirection response to the GMLC, which carries the iPAG address and a data connection identity andora user identity; and the GMLC is configured to transmit a location service request to the iPAG according to the iPAG address in the redirection response, which carries any one or more of following identities: the user bearer identifier, a data connection identity and a user identity.

7. The system according to claim 6, wherein, the system further comprises an Access Control Function (ACF); and the iPAG is configured to: after receiving the location service request, search whether there is the user location information stored locally, and if yes, return the user location information to the BMF or the GMLC, and if no, acquire current user location information from the ACF and return the current user location information to the BMF or the GMLC.

8. The system according to claim 7, wherein, the iPAG is configured to acquire the current user location information from the ACF by:

the iPAG transmitting a location service request to the ACF through a Transfer Packet Access Gateway (tPAG) or transmits a location service request to the ACF directly, wherein, an identity carried in the location service request is one or more of identities carried in the received location service request; and the ACF is configured to return the acquired user location information to the iPAG.

9. The system according to claim 8, wherein, the ACF is further configured to: after detecting a change of the user location, notify the iPAG of information about the changed user location directly through a control interface S3 between the ACF and the iPAG or indirectly through the tPAG.

10. The system according to claim 8, wherein, the system further comprises a Radio Access Network (RAN), configured to: after detecting a change of the user location, notify the iPAG of information about the changed user location directly through a user plane interface U2 between the RAN and the PAG or notifying the iPAG of information about the changed user location indirectly through the tPAG.

* * * * *